United States Patent [19]

Duncan

[11] Patent Number: 5,263,553
[45] Date of Patent: Nov. 23, 1993

[54] WHEEL IMMOBILIZING APPARATUS WITH SPACING AND LATCHING MECHANISMS FOR ACCOMMODATING DIFFERENT WHEEL SIZES

[76] Inventor: Robert M. Duncan, 9040 SW. 184 Ter., Miami, Fla. 33157

[21] Appl. No.: 859,836

[22] Filed: Mar. 30, 1992

[51] Int. Cl.$^5$ .......................... B60P 3/077; B60T 3/00
[52] U.S. Cl. ........................................ 188/32; 70/226; 410/30; 410/49
[58] Field of Search .................... 70/225-228; D12/217; 188/32, 36, 37, 62, 4 R; 410/30, 43, 49, 50, 42

[56] References Cited

U.S. PATENT DOCUMENTS

| | | | |
|---|---|---|---|
| 354,010 | 12/1886 | Black | 188/32 |
| 472,997 | 4/1892 | Hayward | 188/32 |
| 1,047,048 | 12/1912 | Harrison | 410/30 |
| 1,276,430 | 8/1918 | Smith | 410/30 |
| 1,538,998 | 5/1925 | Michod | 188/32 |
| 2,461,248 | 2/1949 | Wright | 188/32 |
| 2,858,906 | 11/1958 | Minick | 188/32 |
| 3,581,846 | 6/1971 | Janus | 188/32 |
| 3,687,238 | 8/1972 | Carpenter | 188/32 |
| 3,695,071 | 10/1972 | West | 188/32 X |
| 4,649,724 | 3/1987 | Raine | 188/32 X |
| 4,804,070 | 2/1989 | Bohler | 188/32 |
| 4,833,442 | 5/1989 | Von Heck | 340/427 |
| 4,888,969 | 12/1989 | Suroff | 70/226 |
| 4,913,265 | 4/1990 | Richards | 188/32 |

FOREIGN PATENT DOCUMENTS

| | | | |
|---|---|---|---|
| 1017928 | 10/1957 | Fed. Rep. of Germany | 188/32 |
| 452251 | 5/1913 | France | 188/32 |
| 14285 | of 1895 | United Kingdom | 188/32 |
| 1066 | of 1896 | United Kingdom | 188/32 |

Primary Examiner—Mark T. Le
Assistant Examiner—Alfred Muratori
Attorney, Agent, or Firm—John R. Flanagan

[57] ABSTRACT

A wheel immobilizing apparatus includes a pair of wheel-blocking bodies, and an adjustable spacing mechanism and a latching mechanism for accommodating different wheel sizes. The wheel-blocking bodies are wedge-shaped to fit against respective rear and front ends of a wheel. Each body has an inner flange fixedly attached to an inner portion of the body and projecting therefrom to assume an overlapped relation with a peripheral portion of an inner side of the wheel to prevent removal of the body in a direction toward an outer side of the wheel. Also, each body has an outer bracket fixedly attached to an outer portion of the body and projecting therefrom to assume an overlapped relation with a portion of an outer side of the wheel. The adjustable spacing mechanism is mounted to the outer brackets and extendible along the outer side of the wheel for adjustably setting the wheel-blocking bodies at a spacing from one another substantially corresponding to the diameter size of the wheel so that the bodies can be placed adjacent to the rear and front ends of the wheel. The latching mechanism is mounted to the outer brackets also and is extendible along the outer side of the wheel for releasably retaining the bodies at the spacing adjustably set by the spacing mechanism with the inner flanges and outer brackets thereon placed in the overlapped relations with the portions of the inner and outer sides of the wheel.

19 Claims, 1 Drawing Sheet

WHEEL IMMOBILIZING APPARATUS WITH SPACING AND LATCHING MECHANISMS FOR ACCOMMODATING DIFFERENT WHEEL SIZES

BACKGROUND OF THE INVENTION

1. Field of the Invention

The present invention generally relates to wheel immobilizing devices and, more particularly, is concerned with a versatile wheel immobilizing apparatus having improved spacing and latching mechanisms for accommodating different wheel sizes.

2. Description of the Prior Art

Vehicular theft is wide-spread and constitutes a challenging problem to solve. One attempt to solving the theft problem is to install a device on a wheel of the vehicle which will immobilize the wheel and thereby thwart attempts to move the vehicle. Representative of the devices in the prior patent art designed to immobilize a vehicle wheel and secure it against movement are the ones disclosed in Bohler U.S. Pat. No. (4,804,070), Von Heck U.S. Pat. No. (4,833,442), Suroff U.S. Pat. No. (4,888,969) and Richards U.S. Pat. No. (4,913,265).

Two basic approaches to the design of wheel immobilizing devices are exemplified by the devices of these patents. The Von Heck, Suroff, and Richards patents exemplify one approach in which devices are designed to physically attach in some manner to the wheel and thus prevent it from rolling through a complete 360° of movement. The Bohler patent exemplifies the other approach in which the device is designed only to physically block the wheel from rolling at all in both forward and reverse directions.

For wheel immobilizing devices to be an effective solution to the vehicular theft problem, they must be relatively simple to use and inexpensive. A wheel immobilizing device, such as exemplified by the Von Heck, Suroff, and Richards patents, which is designed to physically attach in some manner to the wheel, tends to have complicated constructions and requires coordinated manipulation of many parts and thus is relatively difficult to use and expensive. On the other hand, a wheel immobilizing device, such as exemplified by the Bohler patent, which is designed not to attach to the wheel but only to physically block any rolling movement of the wheel, tends to be relatively uncomplicated and thus is relatively simple to use and inexpensive.

For instance, the wheel immobilizing device of the Bohler patent employs a pair of wedge-shaped chocks. Each chock rotatably supports a lockable retaining mechanism which includes a support rod extending transversely through the chock and a pair of elongated retaining arms rigidly affixed to opposite ends of each rod to extend tranversely of the longitudinal axis of the rod. The retaining arms are spaced apart through a distance exceeding the width of the wheel. Each rod is pivotally supported by the chock for rotation about its longitudinal axis between an open position in which both retaining arms are angularly displaced about the axis of the rod from the opposite faces of the region between the chocks occupied by the wheel and a closed position in which both retaining arms extend across the faces of the wheel occupying region between the chocks. The outer ends of the retaining arms of the mechanisms positioned on the same side of the chocks and on the outer side of the wheel can be locked together by a padlock when the retaining arms are in the closed position. The chocks can be removed from opposite front and rear ends of the wheel when the retaining arms are in the open position. The pair of chocks are maintained at a fixed distance from one another by a solid flat spacing bar. Alternatively, the patent discloses that the spacing bar could have slidably adjustable end portions or the chocks could be slidably mounted to the opposite ends of the spacing bar to vary the distance between the chocks to accommodate different size vehicle wheels.

While the above-described wheel immobilizing device of the Bohler patent appears to be a step in the right direction, the inventor herein perceives that it too is unduly complicated and clumsy to use and so does not provide an optimum design for solving the problem of vehicular theft. Consequently, a need still remains for more improvements in the design of wheel immobilizing devices for physically blocking the wheel from rolling in either forward or reverse directions.

SUMMARY OF THE INVENTION

The present invention provides a versatile wheel immobilizing apparatus designed to overcome existing problems and satisfy the aforementioned need. The versatile wheel immobilizing apparatus of the present invention employs a pair of wedge-shaped wheel-blocking bodies and improved spacing and latching mechanisms for releasably interconnecting the wheel-blocking bodies and being adjustable to accommodate different wheel sizes. The spacing and latching mechanisms are uncomplicated in construction and easy to use. The separate wheel-blocking bodies with the mating parts of the spacing and latching mechanisms attached thereto readily store in the trunk of a vehicle when not being used.

Accordingly, the present invention is directed to a a wheel immobilizing apparartus which comprises: (a) a pair of separate wheel-blocking bodies being configured for fitting against respective rear and front ends of a wheel, each of the bodies having an inner flange attached to an inner portion of the body and projecting therefrom to assume an overlapped relation with a peripheral portion of an inner side of the wheel to prevent removal of the body in a direction toward an outer side of the wheel, each of the bodies also having an outer bracket attached to an outer portion of the body and projecting therefrom to assume an overlapped relation with a portion of an outer side of the wheel; (b) spacing means mounted to the outer brackets and extendible along the outer side of the wheel for adjustably setting the wheel-blocking bodies at a spacing from one another substantially corresponding to the diameter size of the wheel so that the bodies can be placed adjacent to respective rear and front ends of the wheel; and (c) latching means mounted to the outer brackets and extendible along the outer side of the wheel for releasably retaining the wheel-blocking bodies at the spacing adjustably set by the spacing means with the inner flanges and outer brackets thereon placed in their overlapped relations with the portions of the inner and outer sides of the wheel.

More particularly, the spacing means includes a plurality of holes defined in spaced relation to one another in one of the respective outer brackets and a link mounted at one end to the other of the respective outer brackets. The link has a catch defined at an opposite end adapted to insert into one of the holes in the one outer bracket and thereby convert the link from a disengaged position to an engaged position with the one outer bracket and setting the spacing between the bodies to correspond to the size of the wheel.

Further, the latching means includes a latch having an elongated slot and being mounted to a first of the respective outer brackets and a loop attached to a second of the respective outer brackets. The latch can be converted from an unlatched to a latched position relative to the loop to insert the loop through the slot of the latch and permit the mounting of a padlock on the loop to retain the latch at the latched position and thereby retain the wheel-blocking bodies at the spacing set by the spacing means with the respective inner flanges and outer brackets thereof at their overlapped relations with portions of the inner and outer sides of the wheel.

More particularly, the latch extends along an outer side of the link of the spacing means. The latch can be pivotally moved from the unlatched to latched position only after the link is placed in the engaged position to thereby overlie and retain the link in the engaged position when the latch is retained at the latched position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
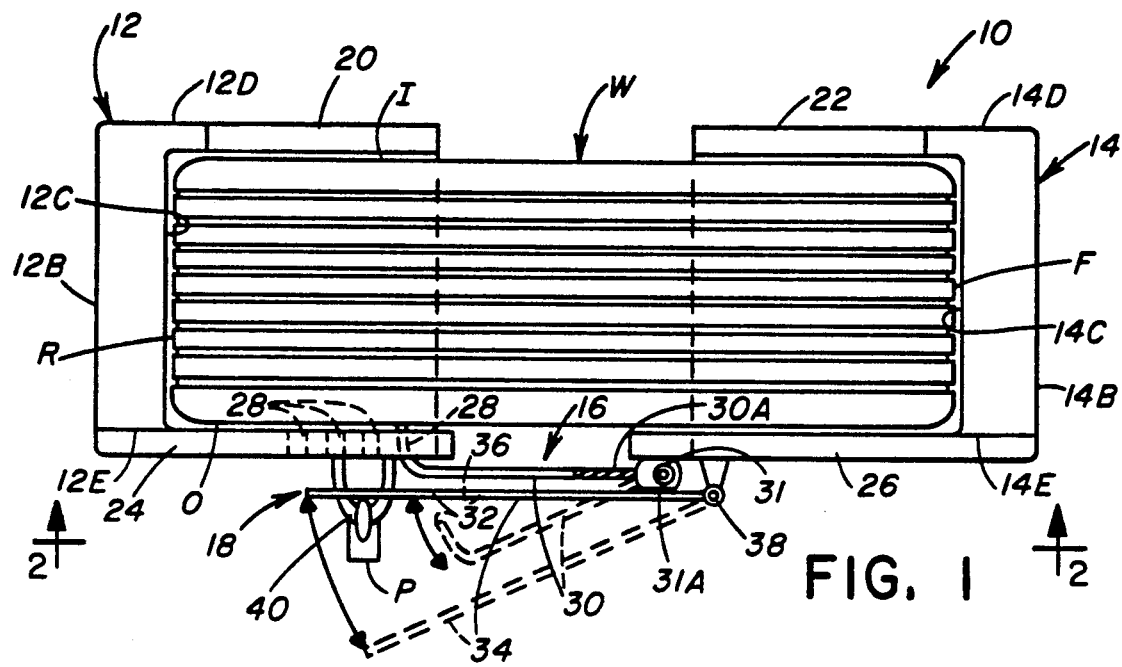
FIG. 1 is a top plan view of a wheel immobilizing apparatus of the present invention applied to a conventional wheel.
Figure 2:
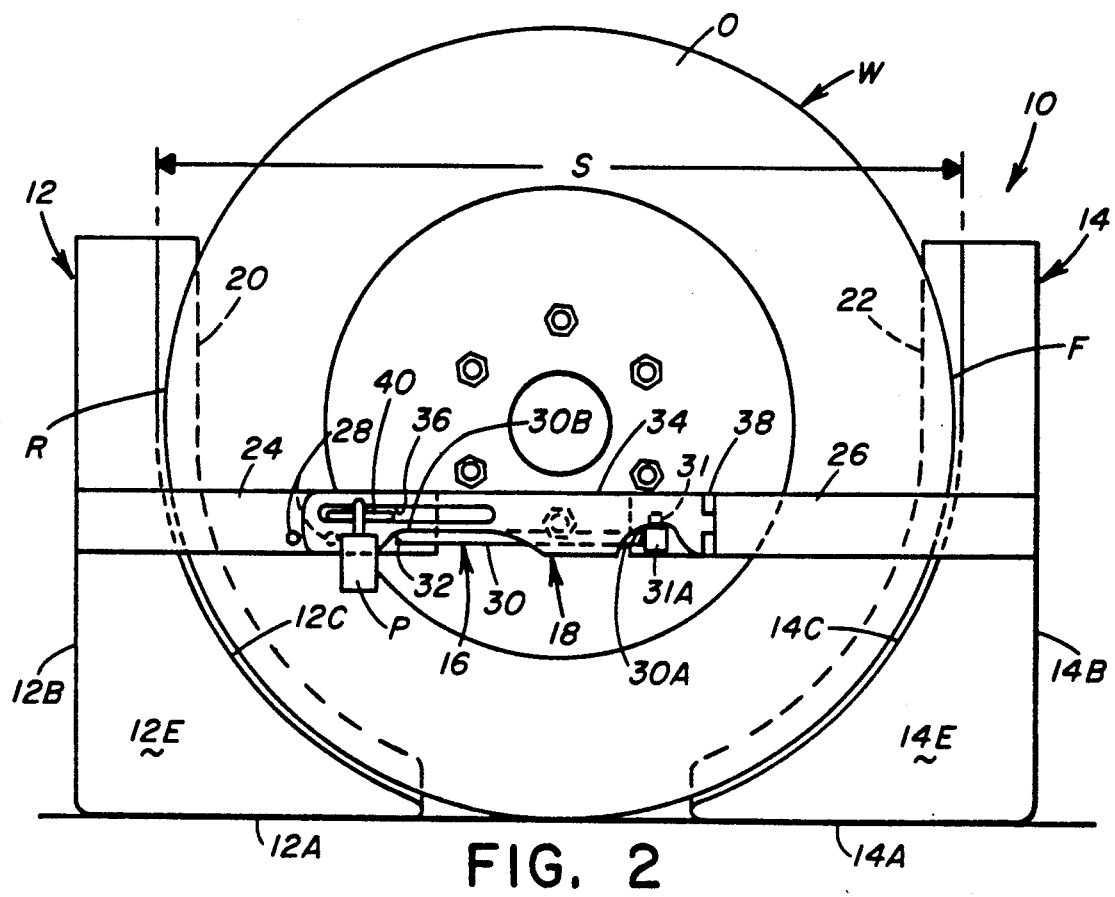
FIG. 2 is an outer side elevational view of the wheel immobilizing apparatus as seen along line 2—2 of FIG. 1.

Referring to FIGS. 1 and 2 of the drawings, there is illustrated a wheel immobilizing apparatus, generally designated 10, of the present invention which is applied to a conventional wheel W so as to block both rearward and forward movements of the wheel W relative the apparatus 10. The immobilizing apparatus 10 can be applied to a wheel W on a variety of different mobile platforms, such as an automobile, motorcycle, boat trailer, or camper, just to name a few. Basically, the wheel immobilizing apparatus 10 includes a pair of wheel-blocking bodies 12, 14, and an adjustable spacing mechanism 16 and a latching mechanism 18 for accommodating the apparatus 10 to different wheel sizes.

The wheel-blocking bodies 12, 14 of the apparatus 10 are each wedge-shaped adapting them to fit against the respective rear and front ends R, F of the wheel W. Each wheel-blocking body 12, 14 has a flat horizontal bottom side 12A, 14A and flat vertical back side 12B, 14B. The back side 12B, 14B extends generally perpendicular to the bottom side 12A, 14A. Each wheel-blocking body 12, 14 also has a front side 12C, 14C extending between and interconnecting the bottom and back sides 12A, 14A and 12B, 14B. The front side 12C, 14C of each wheel-blocking body 12, 14 has an arcuate configuration adapted to fit against a respective one of the rear and front ends R, F of the wheel W.

Further, each wheel-blocking body 12, 14 has an inner lip or flange 20, 22 fixedly attached to an inner side 12D, 14D of the body 12, 14 and projecting therefrom to assume an overlapped relation with a peripheral portion of an inner side I of the wheel W to prevent removal of the body 12, 14, such as by prying or knocking it off the wheel W, in a direction toward an outer side O of the wheel. Preferably, each inner flange 20, 22 has about the same length as the front side 12C, 14C of the respective body 12, 14 so as to extend along the front side 12C, 14C of the respective body 12, 14 from the bottom side 12A, 14A to the top of the body 12, 14.

Also, each wheel-blocking body 12, 14 has an outer bracket 24, 26 fixedly attached to an outer portion of the body 12, 14 and projecting therefrom to assume an overlapped relation with a portion of the outer side O of the wheel W. Preferably, each outer bracket 24, 26 is narrow in width and is fixedly attached at the middle of the outer side 12E, 14E of the respective body 12, 14 and spaced from the top and bottom sides thereof.

The adjustable spacing mechanism 16 of the apparatus 10 is mounted to the outer brackets 24, 26. The spacing mechanism 16 is extendible along the outer side O of the wheel W for adjustably setting the wheel-blocking bodies 12, 14 at a spacing S from one another that substantially corresponds to the diameter size of the wheel W so that the bodies 12, 14 can be placed adjacent to the rear and front ends R, F of the wheel W.

More particularly, the adjustable spacing mechanism 16 includes a plurality of holes 28 defined in spaced relation to one another in the one outer bracket 24 and an elongated link 30 pivotally mounted at one end 30A by a hinge 31 to the other outer bracket 26. The link 30 has a hook-shaped catch 32 defined at an opposite end 30B adapted to insert into a selected one of the holes 28 in the one outer bracket 24. The link 30 is threaded at the one end 30A into a nut 31A attached on the hinge 31. By rotating the link 30, its effective length can be adjusted to align its catch 32 with the selected one of the holes 28. In such manner, the effective length of the link 30 can be preset and the link 30 can then be pivotally moved relative to the one outer bracket 24 and thereby converted from a disengaged position spaced from the one outer bracket 26, as shown in dashed line form in FIG. 1, to an engaged position with the one outer bracket 24, as shown in solid line form in FIG. 1, for adjustably setting the wheel-blocking bodies 12, 14 at the desired spacing S from one another that substantially corresponds to the diameter size of the wheel W so that the bodies 12, 14 can be placed adjacent to respective rear and front ends R, F of the wheel W to block rearward and forward movement of the wheel.

Like the spacing mechanism 16, the latching mechanism 18 of the apparatus 10 is also mounted to the outer brackets 24, 26. The latching mechanism 18 is extendible along the outer side O of the wheel W and outer side fo the spacing mechanism 16 for releasably retaining the spacing mechanism 16 at the engaged position and thereby the wheel-blocking bodies 12, 14 at the spacing S adjustably set by the spacing mechanism 16, where the inner flanges 20, 22 and the outer brackets 24, 26 on the bodies are placed in the overlapped relations with the portions of the inner and outer sides I, O of the wheel W so as to prevent removal of the apparatus 10 from the wheel W.

More particularly, the latching mechanism 18 includes an elongated latch 34 having an elongated slot 36 defined therein. The latch 34 is being pivotally mounted by a hinge 38 to the other outer bracket 26 and an U-shaped loop 40 rigidly attached to the one outer bracket 24. Thus, in the illustrated embodiment, the latch 34 and link 30 are mounted to the other outer bracket 26 adjacent to one another, and the loop 40 and spaced holes 28 are provided on one outer bracket 24 adjacent to but laterally spaced from one another. It should be pointed out that the relative locations of these components of the spacing and latching mechanism 16, 18 could be reversed relative to each other and to the outer brackets 24, 26.

In the illustrated embodiment, the elongated latch 34 of the latching mechanism 18 extends along an outer side of the elongated link 30 of the spacing mechanism 16. The latch 34 can be pivotally moved relative to the other outer bracket 26 and thereby converted from an unlatched position spaced from the link 30 and one outer bracket 26 and loop 40 thereon, as shown in dashed line form in FIG. 1, to a latched position adjacent to and flush with the one outer bracket 26 and mated with the loop 40, as shown in solid line form in FIG. 1, after the link 30 has been moved to its engaged position. In the latched position, the loop 40 is inserted through the elongated slot 36 of the latch 34 to permit locking of the latch 34 to the loop 40, such as by a padlock P, to retain the latch 34 at the latched position. At the latched position, the latch 34 also overlies in a substantially flush relation the link 30 of the spacing mechanism 16 and thereby retains the link 30 in its engaged position in the selected one of the holes 28. In such manner, the wheel-blocking bodies 12, 14 are maintained at the desired spacing S set by the spacing mechanism 16, with the respective inner flanges 20, 22 and outer brackets 24, 26 thereon maintained at their overlapped relations with portions of the inner and outer sides I, O of the wheel W. It will be noted that the slot 36 in the latch 34 is sufficient in length to receive the loop 40 with the catch 32 of the link 30 inserted through any of the holes 28.

The present invention will be understood from the foregoing description and it will be apparent that various changes may be made without departing from the spirit and scope of the invention or sacrificing all of its material advantages, the form hereinbefore described being merely a preferred or exemplary embodiment thereof.

Having thus described the invention, what is claimed is:

1. A wheel immobilizing apparatus, comprising:
 (a) a pair of separate wheel-blocking bodies being configured for fitting against respective rear and front ends of a wheel, each of said bodies having an inner flange attached to an inner portion of said each body and projecting therefrom to assume an overlapped relation with a peripheral portion of an inner side of the wheel to prevent removal of said each body in a direction toward an outer side of the wheel, each of said bodies also having an outer bracket attached to an outer portion of said each body and projecting therefrom to assume an overlapped relation with a portion of an outer side of the wheel;
 (b) spacing means mounted to said outer brackets and extendible along the outer side of the wheel, said spacing means including a link being movable from a disengaged position to an engaged position relative to said outer brackets for adjustably setting said wheel-blocking bodies at a spacing from one another substantially corresponding to the diameter size of the wheel so that said bodies can be placed adjacent to respective rear and front ends of the wheel; and
 (c) latching means mounted to said outer brackets and extendible along the outer side of the wheel, said latching means including a latch extending along and overlying said link of said spacing means and being pivotally movable from an unlatched portion to a latched position relative to said link after said link is in said engaged position for releasably retaining said link in said engaged position and said wheel blocking bodies at said spacing adjustably set by said spacing means with said inner fingers and outer brackets thereof placed in said overlapped relations with the portions of the inner and outer sides of the wheel.

2. The apparatus of claim 1 wherein each of said wheel-blocking bodies has a bottom side and back side extending generally perpendicular to one another.

3. The apparatus of claim 2 wherein each of said wheel-blocking bodies has a front side extending between and interconnecting said bottom and back sides, said front side having an arcuate configuration adapted to fit against respective rear and front ends of the wheel.

4. The apparatus of claim 1 wherein each of said inner flange is fixedly attached to said inner portion of said each respective wheel-blocking body.

5. The apparatus of claim 1 wherein each of said outer brackets is fixedly attached to said outer portion of said each respective wheel-blocking body.

6. The apparatus of claim 1 wherein said spacing means also includes a plurality of holes defined in spaced relation to one another in one of said outer brackets, said link being mounted at one end to the other of said outer brackets.

7. The apparatus of claim 6 wherein said link has a catch defined at an opposite end of said link being adapted to insert into one of said holes in said one outer bracket and thereby convert said link from said disengaged position to said engaged position with said one outer bracket and setting said spacing between said bodies to correspond to the size of the wheel.

8. The apparatus of claim 1 wherein said latching means also includes said latch having an elongated slot and being mounted to a first of said outer brackets and a loop attached to a second of said outer brackets, said latch being pivotally movable from said unlatched to said latched position relative to said loop in which said loop is inserted through said slot of said latch to permit locking of said latch at said latched position and thereby retain said wheel-blocking bodies at said spacing set by said spacing means with said inner flanges and outer brackets thereof at said overlapped relations with portions of the inner and outer sides of the wheel.

9. The apparatus of claim 8 wherein said spacing means also includes a plurality of holes defined in spaced relation to one another in one of said outer brackets, said link being mounted at one end to the other of said outer brackets.

10. The apparatus of claim 9 wherein said one outer bracket is said second outer bracket, said loop being mounted on said second outer bracket laterally of and spaced from said plurality of spaced holes defined in said second outer bracket.

11. The apparatus of claim 10 wherein said other outer bracket is said first outer bracket, said latch and said link being mounted to said first outer bracket adjacent to one another.

12. The apparatus of claim 9 wherein said link has a catch defined at an opposite end of said link being adapted to insert into one of said holes in said one outer bracket and thereby convert said link from said disengaged position to said engaged position with said one outer bracket and set said spacing between said wheel-blocking bodies to correspond to the size of the wheel.

13. A wheel immobilizing apparatus, comprising:
(a) a pair of separate wheel-blocking bodies being generally wedge-shaped and adapted to fit against respective rear and front ends of a wheel, each of said bodies having an inner flange attached to an inner portion of said each body and projecting therefrom to assume an overlapped relation with a peripheral portion of an inner side of the wheel to prevent removal of said each body in a direction toward an outer side of the wheel, each of said bodies also having an outer bracket attached to an outer portion of said each body and projecting therefrom to assume an overlapped relation with a portion of the outer side of the wheel;
(b) an adjustable spacing mechanism including a plurality of holes defined in one of said outer brackets in spaced relation to one another and a link mounted at one end to the other of said outer brackets and having a catch defined at an opposite end adapted to insert into one of said holes in said one outer bracket and thereby convert said link from a disengaged position to an engaged position with said one outer bracket for adjustably setting said bodies at a spacing from one another substantially corresponding to the diameter size of the wheel so that said bodies can be placed adjacent to respective rear and front ends of the wheel; and
(c) a latching mechanism including a latch having an elongated slot and being pivotally mounted to a first of said outer brackets and a loop attached to a second of said outer brackets, said latch extending along an outer side of said link of said spacing mechanism and being capable of pivoting from an unlatched position to a latched position relative to said loop, after said link is in said engaged position, in which said loop is inserted through said slot of said latch to permit locking of said latch to retain it at said latched position in which said latch overlies and retains said link in the engaged position and thereby the wheel-blocking bodies at said spacing set by said spacing mechanism with said inner flanges and outer brackets thereof at said overlapped relations with portions of the inner and outer sides of the wheel.

14. The apparatus of claim 13 wherein each of said wheel-blocking bodies has a bottom side and back side extending generally perpendicular to one another.

15. The apparatus of claim 14 wherein each of said wheel-blocking bodies has a front side extending between and interconnecting said bottom and back sides, said front side having an arcuate configuration adapted to fit against the rear and front ends of the wheel.

16. The apparatus of claim 13 wherein each of said inner flange is fixedly attached to said inner portion of said each respective wheel-blocking body.

17. The apparatus of claim 13 wherein each of said outer brackets is fixedly attached to said outer portion of said each respective wheel-blocking body.

18. The apparatus of claim 13 wherein said one outer bracket is said second outer bracket, said loop being mounted on said second outer bracket laterally of and spaced from said plurality of spaced holes defined in said second outer bracket.

19. The apparatus of claim 18 wherein said other outer bracket is said first outer bracket, said latch and said link being mounted to said first outer bracket adjacent to one another.

* * * * *